United States Patent
Kang et al.

(10) Patent No.: US 11,828,408 B2
(45) Date of Patent: Nov. 28, 2023

(54) MONITOR RISER WITH STOW-AWAY DRY ERASE PAD

(71) Applicant: ACCO Brands Corporation, Lake Zurich, IL (US)

(72) Inventors: Seesong Kang, Northbrook, IL (US); Thomas A. Nelson, Naperville, IL (US)

(73) Assignee: ACCO Brands Corporation, Lake Zurich, IL (US)

( * ) Notice: Subject to any disclaimer, the term of this patent is extended or adjusted under 35 U.S.C. 154(b) by 0 days.

(21) Appl. No.: 17/574,202

(22) Filed: Jan. 12, 2022

(65) Prior Publication Data

US 2022/0228700 A1    Jul. 21, 2022

Related U.S. Application Data

(60) Provisional application No. 63/138,588, filed on Jan. 18, 2021.

(51) Int. Cl.
| | | |
|---|---|---|
| *F16M 11/20* | (2006.01) | |
| *F16M 11/04* | (2006.01) | |
| *F16M 11/10* | (2006.01) | |
| *A47B 97/04* | (2006.01) | |
| *A47B 21/03* | (2006.01) | |
| *A47B 23/04* | (2006.01) | |

(Continued)

(52) U.S. Cl.
CPC .............. *F16M 11/20* (2013.01); *A47B 97/04* (2013.01); *F16M 11/048* (2013.01);
(Continued)

(58) Field of Classification Search
CPC ...... F16M 11/20; F16M 11/048; F16M 11/10; F16M 2200/08; F16M 11/2007;
(Continued)

(56) References Cited

U.S. PATENT DOCUMENTS

| 4,635,893 A | * | 1/1987 | Nelson | ................... | A47B 21/02 |
| | | | | | 400/718 |
| 4,657,214 A | * | 4/1987 | Foster | ................. | A47B 21/0314 |
| | | | | | 248/176.1 |

(Continued)

OTHER PUBLICATIONS

Amazon, "Quartet Glass Desktop Computer Pad, 18" x 6", Whiteboards, Dry Erase Surface, White Surface (GDP186)" <https://www.amazon.com/Quartet-Whiteboard-Desktop-Computer-GDP186/dp/B01M2DADUX> webpage available since Nov. 2, 2016 (11 pages).

(Continued)

*Primary Examiner* — Tan Le
(74) *Attorney, Agent, or Firm* — Michael Best & Friedrich LLP

(57) ABSTRACT

A monitor riser includes a base configured to be received on a horizontal support surface. A monitor support shelf is situated atop and supported by the base. A slide mechanism is situated below the monitor support shelf. A dry erase pad is supported by the slide mechanism and movable in a frontward direction from a stowed position in which the dry erase pad is at least partially received under the monitor support shelf to an extended position. The dry erase pad, when in the extended position, is movable to a propped position in which the dry erase pad is angled from horizontal to present a dry erase writing surface toward a user at a front side of the monitor support shelf.

22 Claims, 16 Drawing Sheets

(52) U.S. Cl.
CPC .......... *F16M 11/10* (2013.01); *A47B 21/0314* (2013.01); *A47B 23/043* (2013.01); *F16M 11/2092* (2013.01); *F16M 2200/08* (2013.01)

(58) Field of Classification Search
CPC ..... F16M 11/2092; A47B 97/04; A47B 97/00; A47B 23/043; A47B 21/0314
See application file for complete search history.

(56) References Cited

U.S. PATENT DOCUMENTS

| | | | | |
|---|---|---|---|---|
| 5,452,876 | A | * | 9/1995 | Hatcher ............... A47B 21/045 400/718 |
| 5,651,524 | A | * | 7/1997 | Calfee ................. F16M 11/2092 248/442.2 |
| 6,042,075 | A | * | 3/2000 | Burch, Jr. ............. G06F 3/0202 248/442.2 |
| 6,109,585 | A | * | 8/2000 | Burch, Jr. .......... A47B 21/0314 248/442.2 |
| 2002/0125801 | A1 | * | 9/2002 | Rauls ................. A47B 21/0314 312/330.1 |

OTHER PUBLICATIONS

Amazon, "Kensington SmartFit Monitor Stand Plus for up to 24" screens—Black (K52786WW)" <https://www.amazon.com/Kensington-SmartFit-Monitor-Stand-screens/dp/B01MQTE2T5?th=1> webpage available since Jul. 7, 2004 (10 pages).

* cited by examiner

MONITOR RISER WITH STOW-AWAY DRY ERASE PAD

CROSS-REFERENCE TO RELATED APPLICATIONS

This application claims priority to U.S. Provisional Patent Application No. 63/138,588, filed on Jan. 18, 2021, the entire contents of which are incorporated by reference herein.

BACKGROUND

Monitor risers are known to provide an elevated support surface for a computer monitor, for example atop a desk. Dry erase boards are known for providing erasable writing surfaces, most commonly for mounting on walls. A user of a computer positioned at a desk may keep a paper note pad nearby for writing important notes during use of the computer. Alternately, the user may move from a working position at the desk to a nearby wall surface to utilize a wall-mounted dry erase board for making hand-written notes.

SUMMARY

In some aspects, the invention provides an integrated solution of a dry erase pad on a monitor riser. Information written on the dry erase pad surface can be protected for security reasons and from getting erased by stowing (at least partially, mostly, or fully) beneath the monitor support shelf. The stow-away dry erase pad is integrated on the monitor riser and props easily to a user's desired angle of a plurality of available prop angles to provide a comfortable writing experience.

In some aspects, the invention provides a monitor riser including a base configured to be received on a horizontal support surface. A monitor support shelf is situated atop and supported by the base. A slide mechanism is situated below the monitor support shelf. A dry erase pad is supported by the slide mechanism and movable in a frontward direction from a stowed position in which the dry erase pad is at least partially received under the monitor support shelf to an extended position. The dry erase pad, when in the extended position, is movable to a propped position in which the dry erase pad is angled from horizontal to present a dry erase writing surface toward a user at a front side of the monitor support shelf.

In some aspects, the invention provides a monitor riser including a monitor support shelf situated atop and supported by a base. The monitor riser further includes a dry erase pad movable from a stowed position under the monitor support shelf to an extended position. The dry erase pad, when in the extended position, is pivotable to a plurality of propped positions, each of which presents a dry erase writing surface of the dry erase pad to be angled toward a front user-facing side of the monitor support shelf.

Other aspects of the embodiments will become apparent by consideration of the detailed description and accompanying drawings.

Other aspects of the embodiments described herein will become apparent by consideration of the detailed description.

DETAILED DESCRIPTION

Figure 1:
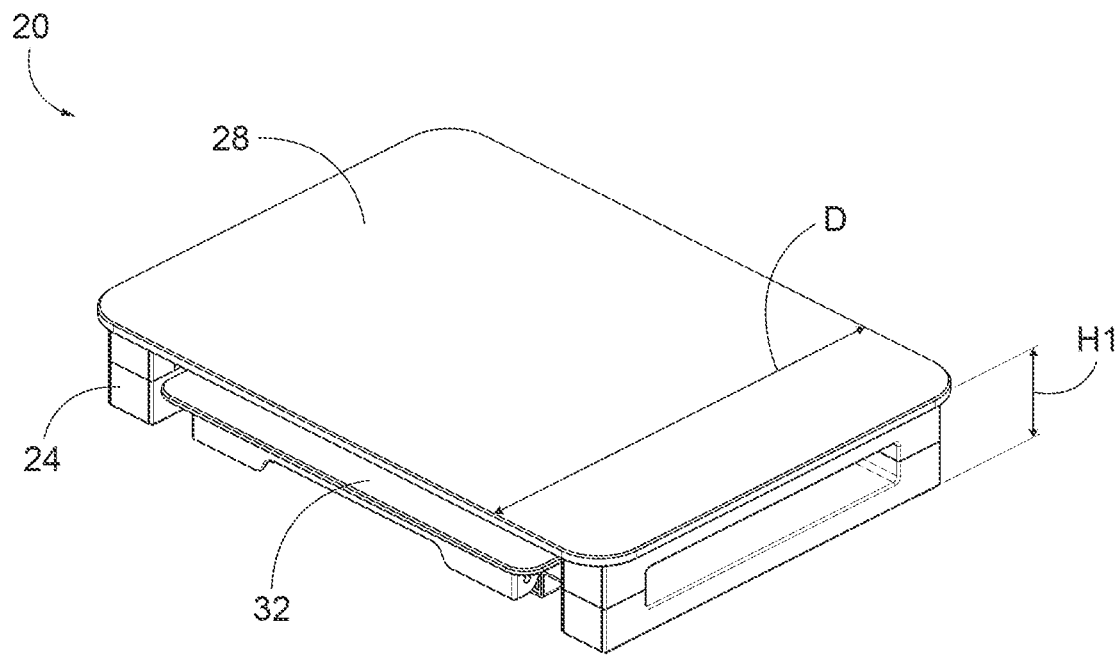
FIG. 1 is a perspective view showing a monitor riser according to an embodiment of the present disclosure. The monitor riser is configured to provide a first riser height.
Figure 2:
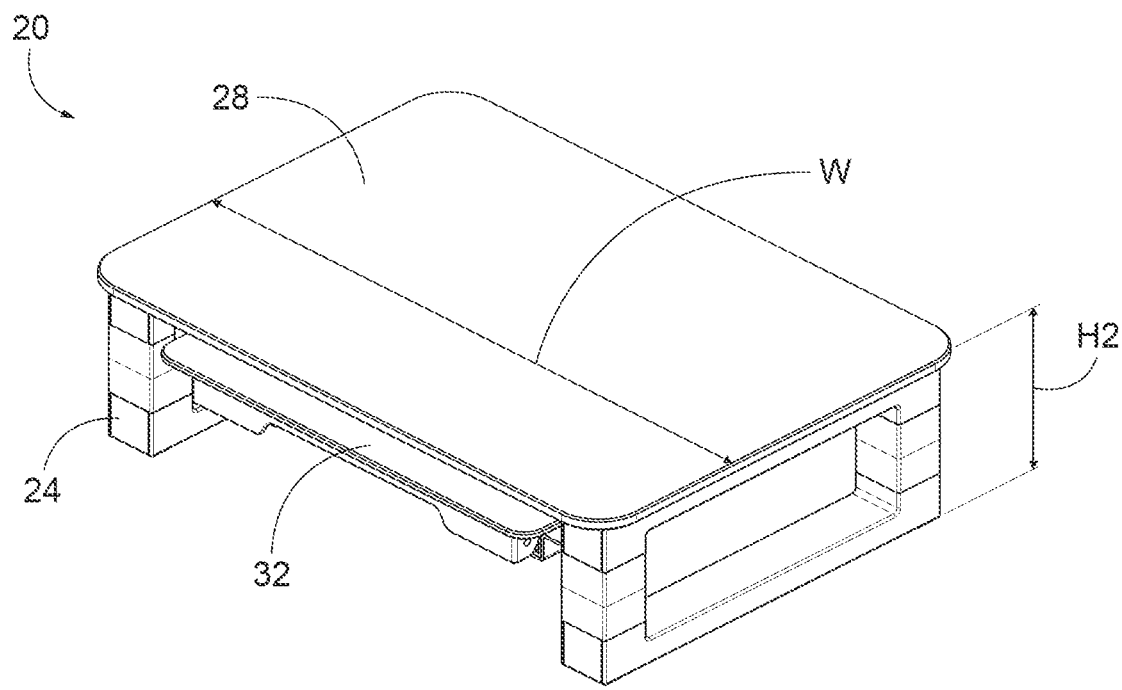
FIG. 2 is a perspective view showing the monitor riser of FIG. 1 configured to provide a second riser height greater than the first riser height.
Figure 3:
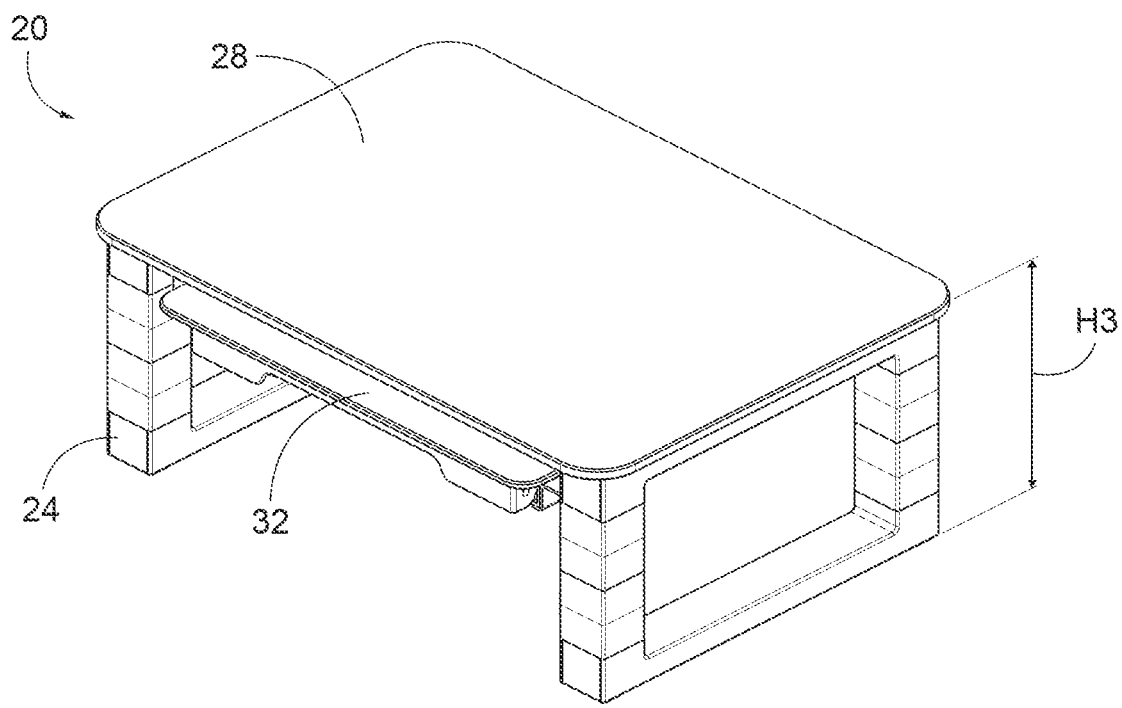
FIG. 3 is a perspective view showing the monitor riser of FIG. 1 configured to provide a third riser height greater than the second riser height.
Figure 4:
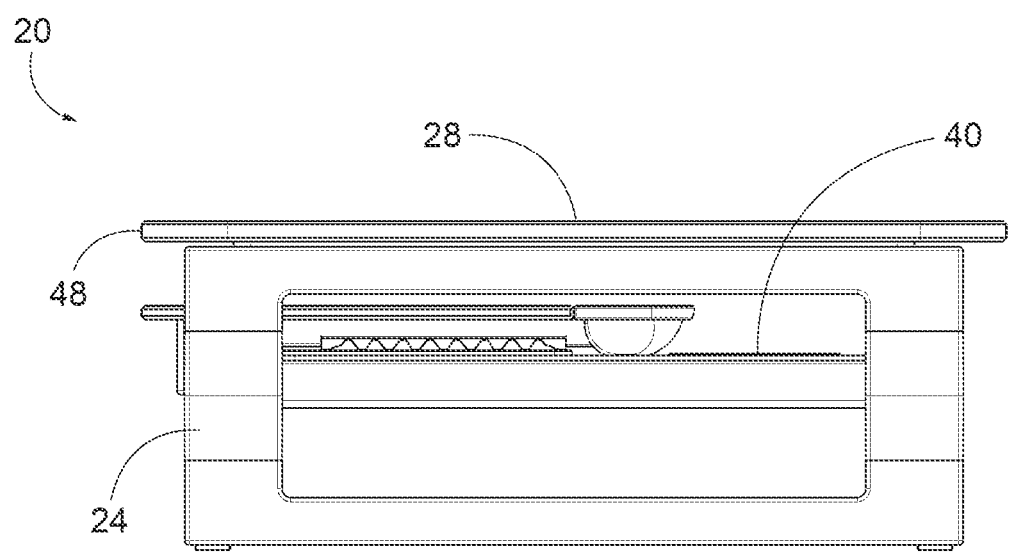
FIG. 4 is a right side elevation view of the monitor riser of FIG. 1, showing a dry erase pad thereof in a stowed position.

As shown in FIGS. 1-3, a monitor riser 20 includes a monitor support shelf 28 supported by a base provided in the illustrated construction by a plurality of base elements 24. As shown by the three different configurations of FIGS. 1-3, the monitor riser 20 may be adjustable to different riser heights H1, H2, H3. The monitor riser 20 can be reconfigured to the different riser heights H1, H2, H3 by the selective use of more or fewer of the removable base elements 24 that are positionable under and coupled to the monitor support shelf 28. The monitor support shelf 28 can be a horizontal monitor support shelf configured to take a flat horizontal orientation when the monitor riser 20 is supported on a flat horizontal support surface, such as an office desk for example. In some constructions, the monitor support shelf 28 is constructed of a glass panel. The base elements 24 can take the form of support blocks that snap together with each other in a vertical direction. The base elements 24 can be used additively to build sequential vertical courses to achieve the increased heights H2, H3. The base elements 24 form mechanical bonds on their own by interfacing complementary shapes, without adhesives or ancillary fasteners. The base elements 24, at least the top course thereof, also interface similarly with the bottom side of the monitor support shelf 28. In other words, the bottom of the monitor support shelf 28 can have a mechanical interface that matches shapes of the base elements 24 for connection therewith in the same way that the base elements 24 connect with each other. As illustrated, the base elements 24 can include top-most and/or bottom-most elements that span substantially a full depth D of the monitor support shelf 28, along with intermediate base elements of a different, smaller footprint. The depth D of the monitor support shelf 28 is measured in the horizontal plane perpendicular to a lateral width W of the monitor support shelf 28. The monitor support shelf 28, like the dry erase pad 32, can have an overall rectangular shape (e.g., rectangular with rounded corners as shown), but may also be constructed in alternate shapes. The bottom-most base elements 24 can include slip-resistant elastomer grippers on a bottom side thereof to contact a desktop surface.

Figure 5:
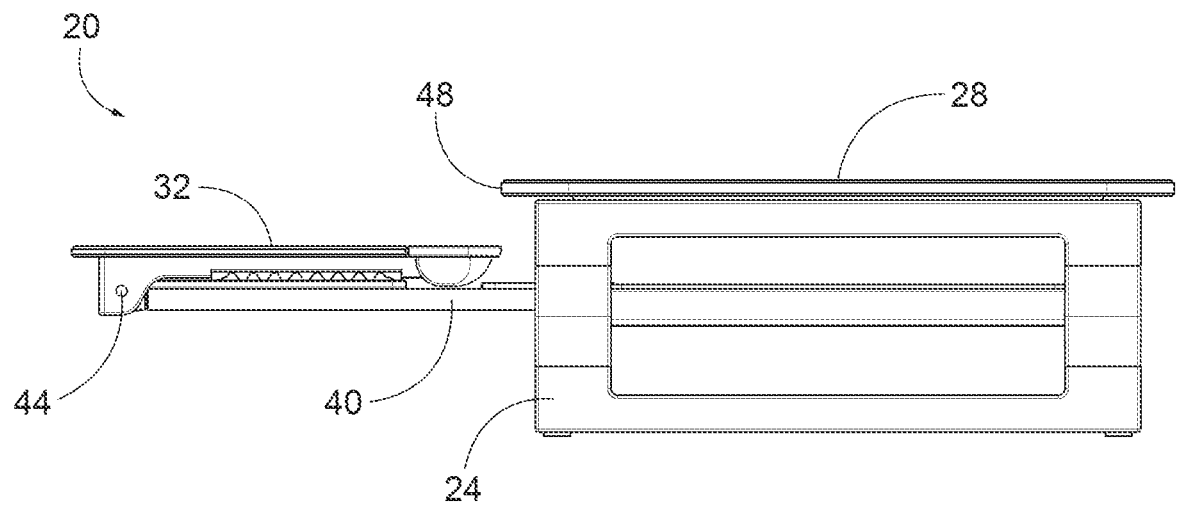
FIG. 5 is a right side elevation view of the monitor riser of FIG. 1, showing the dry erase pad thereof in an outwardly extended position along a slide assembly.
Figure 6:
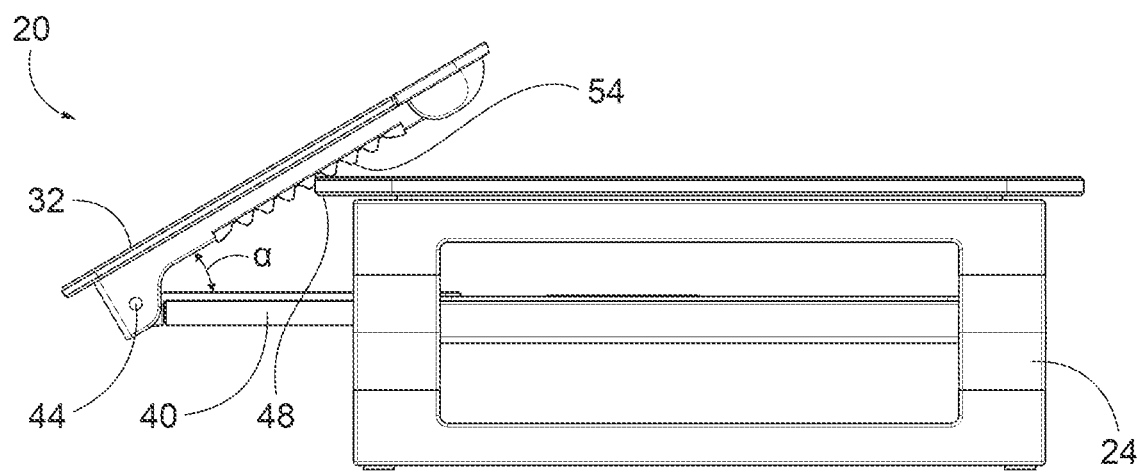
FIG. 6 is right side elevation view of the monitor riser of FIG. 1, showing the dry erase pad thereof in a propped position.

As described further below, the monitor riser 20 further incorporates a dry erase pad 32 that is stowable under the monitor support shelf 28. The dry erase pad 32 can be stowed away, but readily deployable to one or more operative positions without taking up additional desk space. The dry erase pad 32, which can also be referred to as a board or tablet, is of a relatively small size conducive for desktop use, similar to a standardized or oversized paper note pad. The dry erase pad 32 includes a dry erase writing surface (e.g., of a glass panel) for use with dry erase markers and a suitable eraser or wiper that removes markings from the writing surface. The dry erase surface is concealable under the monitor support shelf 28 when the dry erase pad 32 is stowed, thus providing an element of privacy for the user as well as protection against incidental erasure by the user. As shown in at least FIGS. 7 and 8, the dry erase pad 32 can include, in some embodiments, a marker tray 36 adapted to hold one or more dry erase markers (or other small desktop accessories) adjacent the dry erase writing surface. As shown, the tray 36 is situated at a top side of the dry erase pad 32. The dry erase pad 32 is stowable under and extendable out from the monitor support shelf 28 by a slide mechanism 40 that supports the dry erase pad 32 for sliding movement in two opposite depth-wise directions. FIGS. 1-4 illustrate the dry erase pad 32 in a first or stowed position. FIG. 5 illustrates the dry erase pad 32 slid out from the monitor support shelf 28 to a second or extended position. The dry erase pad 32 is slidable from the stowed position to the extended position by movement in a frontward or forward direction that is toward a user of the monitor riser 20 and to the left in FIGS. 4-6. The slide mechanism 40 can be connected (e.g., by fastening or bonding) to the underside of the monitor support shelf 28 and/or the top-most base elements 24 on each lateral side. The slide mechanism 40 can include nested metal rails with anti-friction bearings therebetween.

Figure 7:
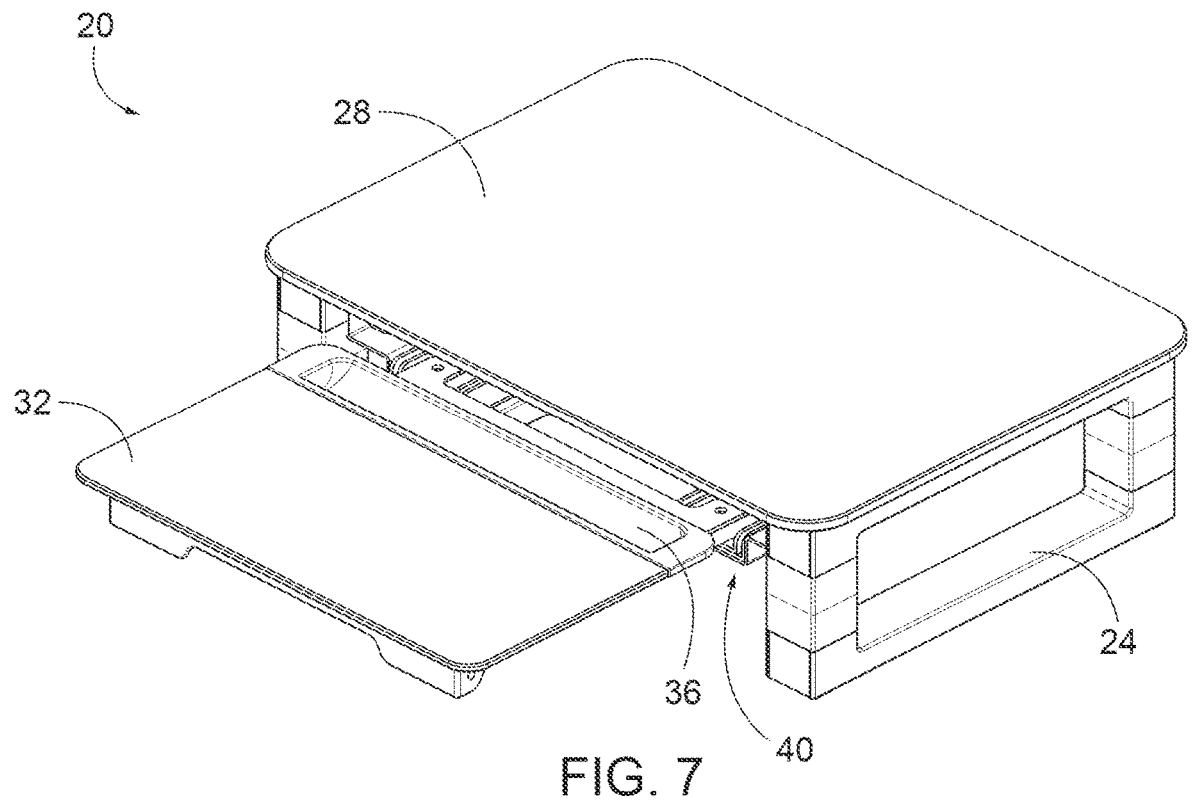
FIG. 7 is a perspective view of the monitor riser of FIG. 1, showing the dry erase pad thereof in the outwardly extended position.
Figure 8:
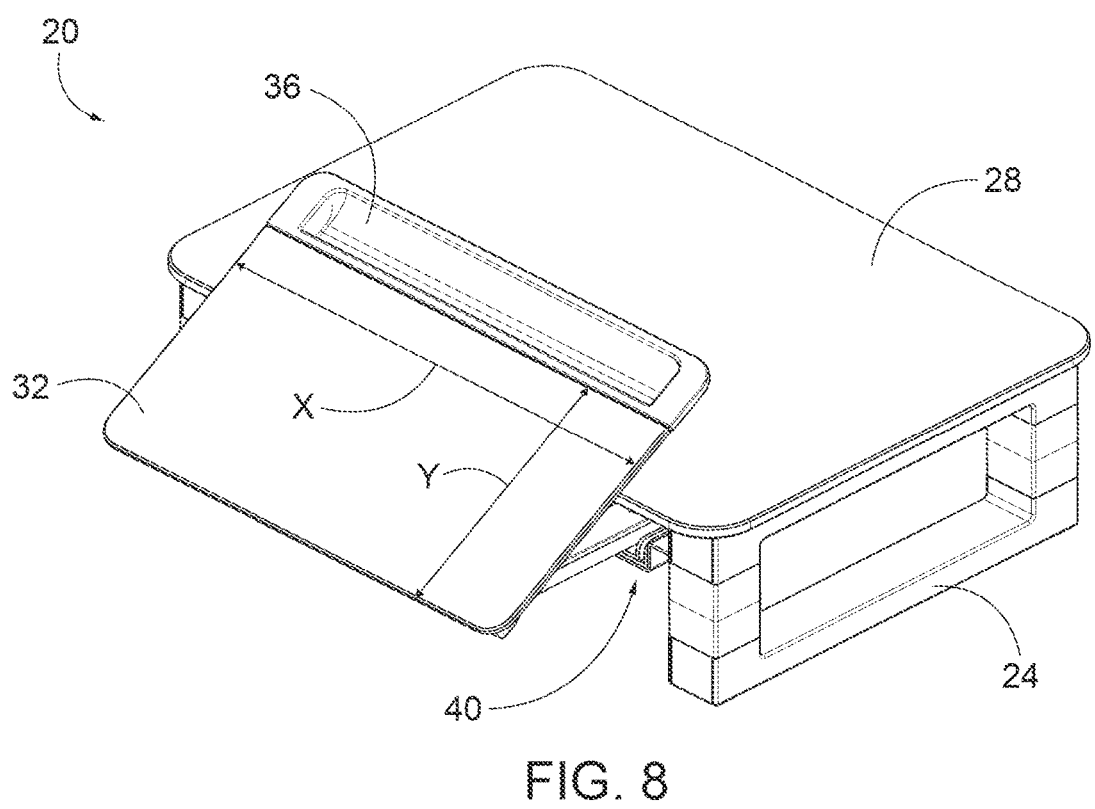
FIG. 8 is a perspective view of the monitor riser of FIG. 1, showing the dry erase pad thereof in the propped position.
Figure 9:
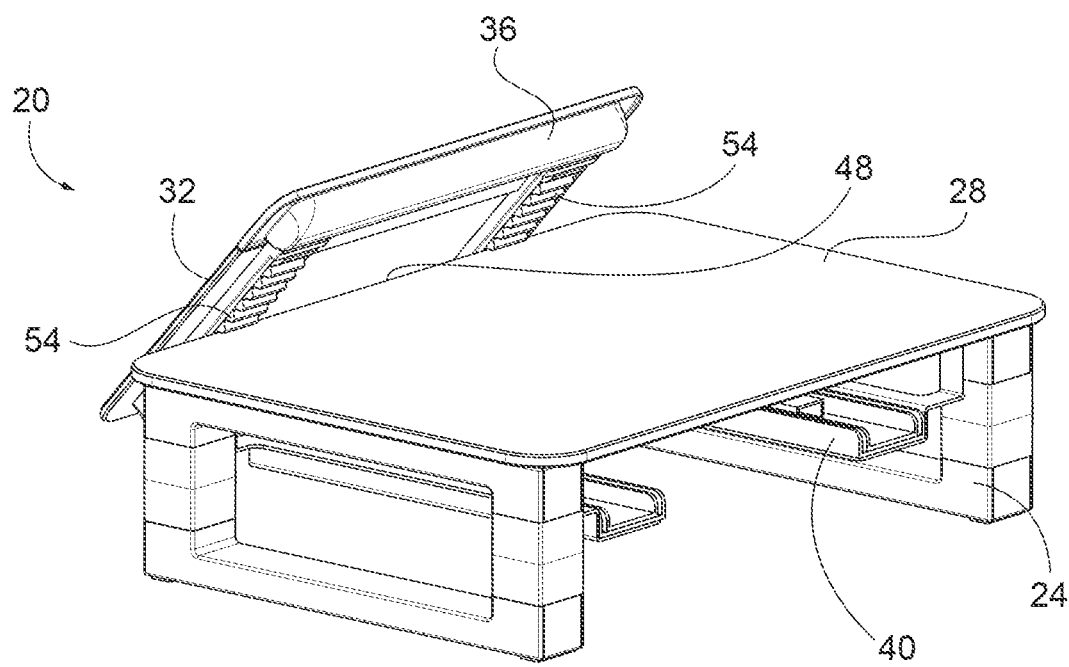
FIG. 9 is a rear perspective view of the monitor riser of FIG. 1, showing the dry erase pad thereof in the propped position.

When deployed by sliding out from the monitor support shelf 28, the dry erase pad 32 can be presented for use in the horizontal extended position of FIGS. 5 and 7. However, the dry erase 32, once extended, can also be adjusted to at least one upright or propped orientation (non-zero angle α defined between dry erase pad writing surface and horizontal), such as the one shown in FIGS. 6 and 8. This is accomplished with a simple arrangement of features to limit part count and assembly complexity. The dry erase pad 32 is pivotally coupled with the slide mechanism 40 at a hinge 44. The hinge 44 can be provided, for example, adjacent a forward (user-facing) edge thereof, the hinge 44 provided at a bottom side of the dry erase pad 32 opposite the writing surface. The back or rear side of the dry erase pad 32 rests on a front edge 48 of the monitor support shelf 28. The dry erase pad 32 can be propped up in this way, without the use of fasteners and without the provision of a locking mechanism, although the addition of such features is also contemplated for added securement. As can be appreciated from the figures such as FIGS. 5-6, the slide mechanism 40 can be partially retracted or collapsed back toward the stowed position to facilitate the dry erase pad 32 being propped.

Figure 10:
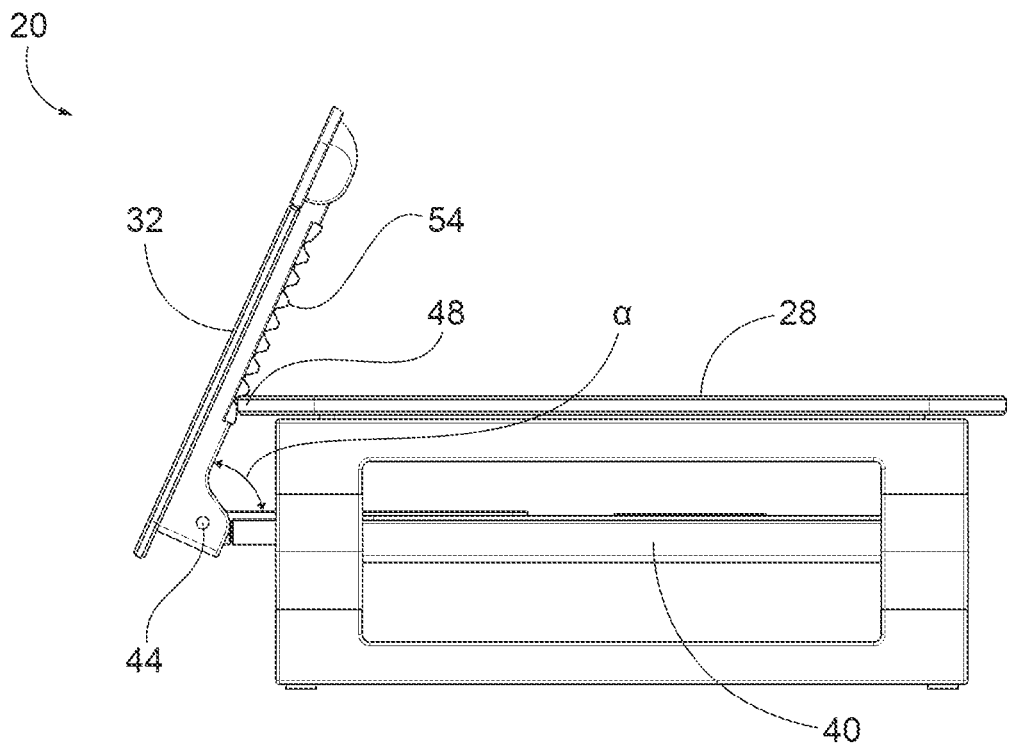
FIG. 10 is a right side elevation view of the monitor riser of FIG. 1, showing the dry erase pad thereof in an alternate propped position.
Figure 11:
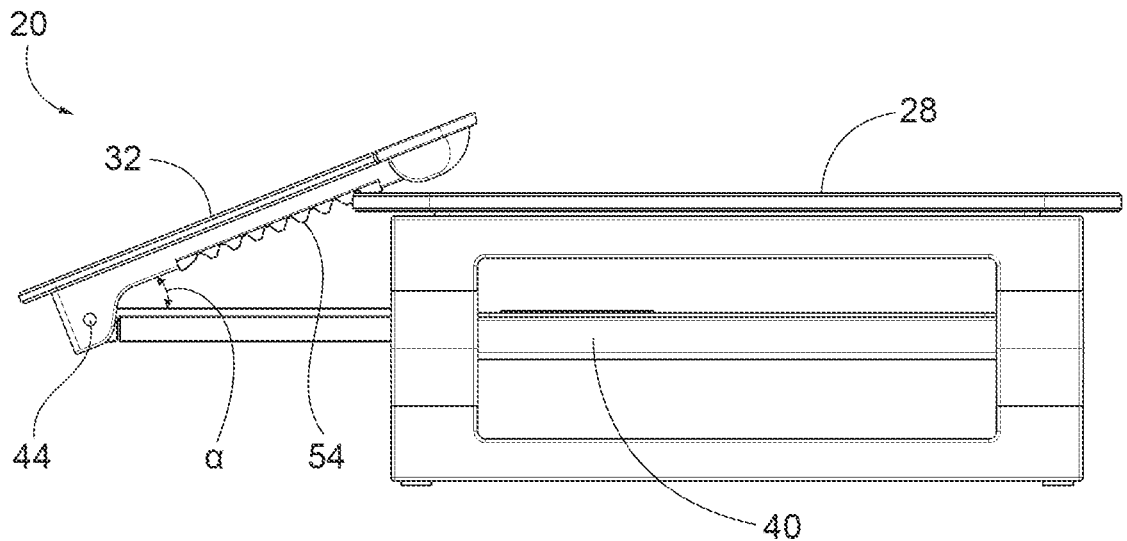
FIG. 11 is a right side elevation view of the monitor riser of FIG. 1, showing the dry erase pad thereof in an alternate propped position.
Figure 12:
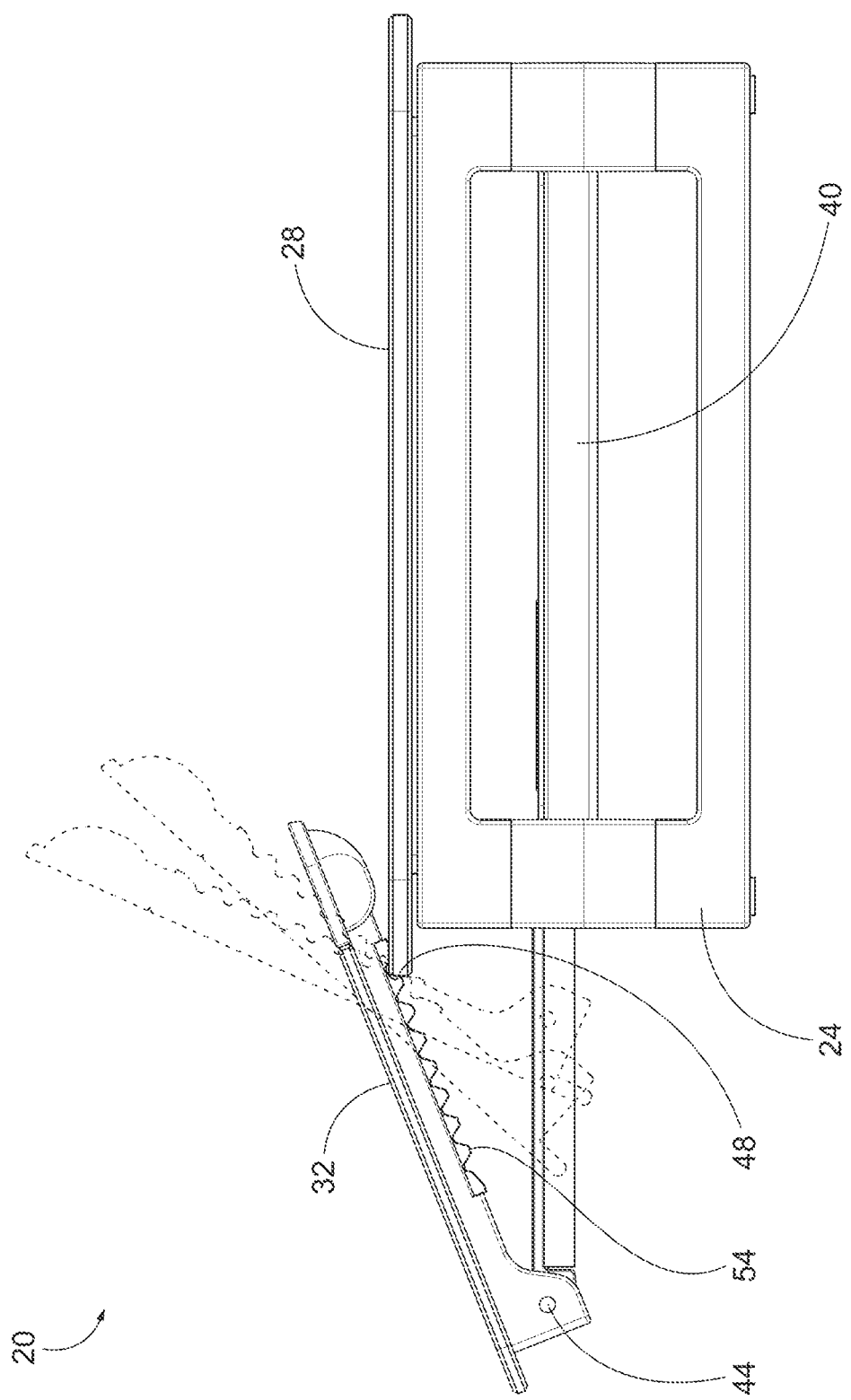
FIG. 12 is a right side elevation view of the monitor riser of FIG. 1, showing the dry erase pad thereof in a range of propped positions.

The contact between the rear side of the dry erase pad 32 and the front edge 48 of the monitor support shelf 28 can take a number of different forms. Furthermore, it is conceived that the dry erase pad 32 can be propped up in one or more orientations without contacting the front edge 48 of the monitor support shelf 28 (e.g., contacting a top surface of the shelf 28 or a separate member). In some constructions, the back or underside of the dry erase pad 32 can be provided with a series of undulations, serrations, etc. that create discrete retainers 54 in the form of pockets or edges to receive the front edge 48 of the monitor support shelf 28. The retainers 54 define multiple discrete prop angles α for the dry erase pad 32 (e.g., at least two prop angles α greater than zero degrees and less than 90 degrees). FIGS. 10 and 11 illustrate two prop angles α that provide the steepest and shallowest propped positions of the dry erase pad 32. These retainers 54 can be provided along the two laterally outboard edge (as shown) or in other locations (e.g., a single central row) on the back of the dry erase pad 32, opposite the writing surface. As illustrated, the retainers 54 provide eight separate propped orientations (see FIG. 12). However, these may be provided in numbers more or less than eight. The front edge 48 of the shelf 28 may form a snap interface with the back of the dry erase pad 32 or may simply pass with clearance into a fully seated position. In other constructions, the back of the dry erase pad 32 may be provided without the retainers 54 if the surface(s) providing the interface provide suitable friction to support the dry erase pad 32 upright during use (e.g., rubber strip(s) and/or texturing).

Figure 13:
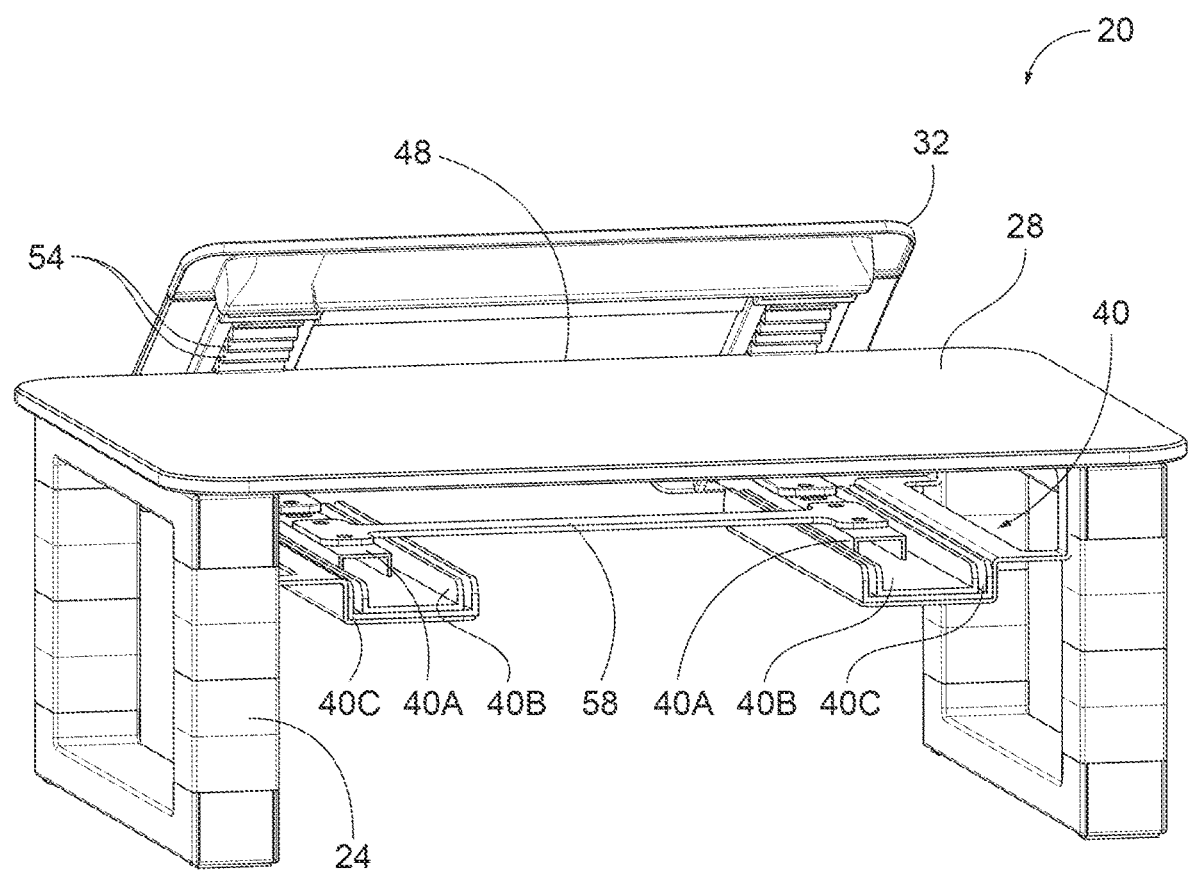
FIG. 13 is a rear perspective view of the monitor riser of FIG. 1, showing a stabilizer bar.

FIG. 13 illustrates the monitor riser 20 with the addition of an optional stabilizer bar 58. The stabilizer bar 58 is a rigid member or strap that connects opposite lateral sides of the slide mechanism 40 so as to maintain a fixed spacing therebetween. The stabilizer bar 58 can be constructed of metal or hard plastic. The stabilizer bar 58 can, in some constructions, promote smooth sliding of the dry erase pad 32 by reducing or eliminating the risk of splaying, twisting, or racking that may lead to binding within the slide mechanism 40 rather than smooth gliding. As shown, the stabilizer bar 58 has first and second ends fixed to first and second inner slide members 40A of the slide mechanism 40, the inner slide members 40A extending to make the connection with the dry erase pad 32 at the hinge 44. In other words, the inner slide members connected with the stabilizer bar 58 can move directly with the dry erase pad 32 when stowing or extending relative to the support shelf 28. As can be seen in FIG. 13, the slide mechanism 40 can further include intermediate and outer slide members 40B, 40C in which the inner slide members 40A are nestingly and slidably received for telescopic extension and retraction of the slide mechanism 40.

Figure 14:
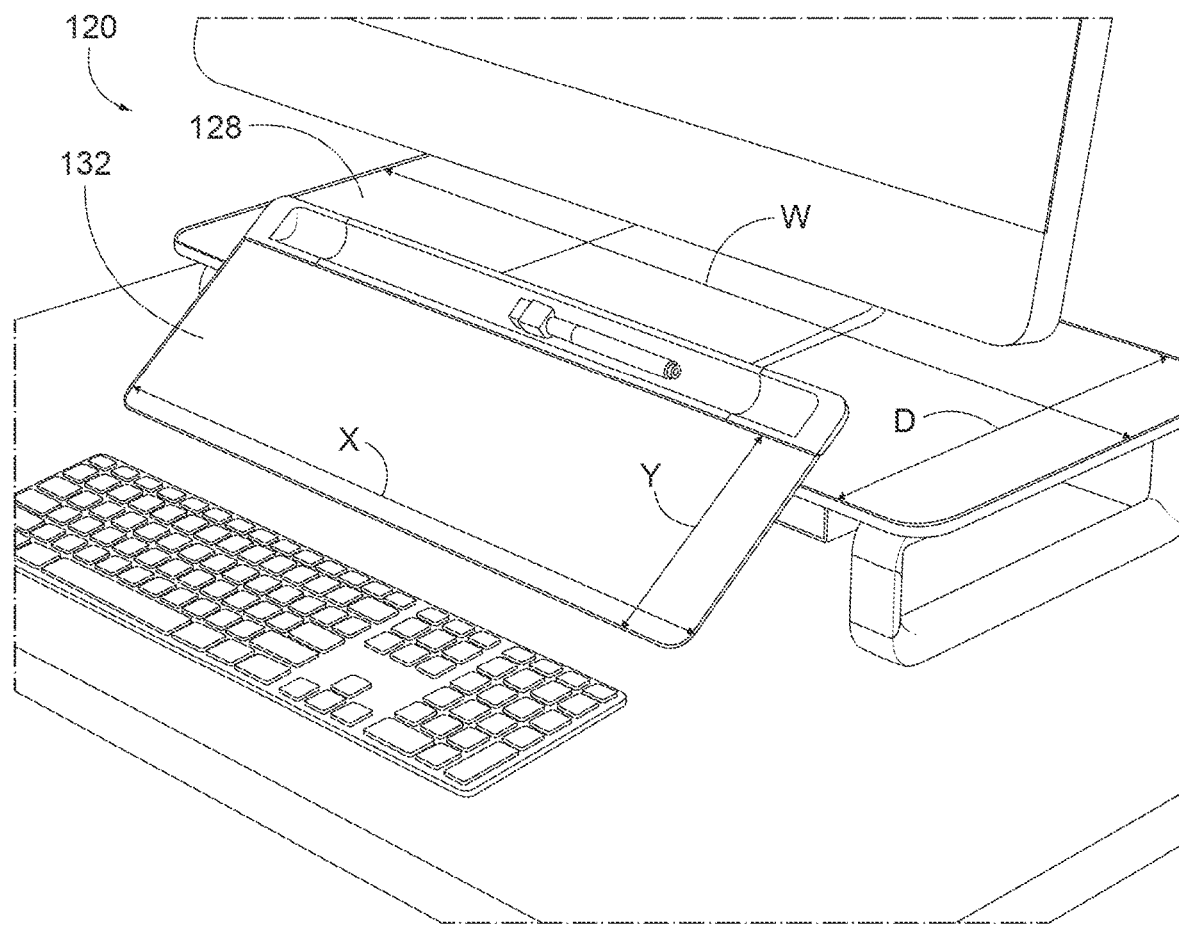
FIG. 14 is a perspective view of a monitor riser of a second embodiment including alternate dimensional relations.

FIG. 14 is a perspective view of a monitor riser 120 according to a second embodiment. The monitor riser 120 can include any or all of the features noted above with respect to the monitor riser 20 of FIGS. 1-13. Thus, reference is made to the preceding description. However, it can be seen that the monitor riser 120 is constructed with an overall wider lateral width W as compared to its depth D (i.e., a different aspect ratio) of the monitor support shelf 128. Similarly, the dry erase pad 132 has a different aspect ratio than that of FIGS. 1-13. The dry erase pad 132 of FIG. 14 can have a width to height ratio (X:Y) of greater than 2:1 (e.g., 2.5:1 or 3:1), while the dry erase pad 32 of FIGS. 1-13 can have a width-to-height ratio (X:Y) of 2:1 or less (e.g., 4:3 or 16:9). These aspect ratios may be the aspect ratios of the dry erase surface.

Figure 18:
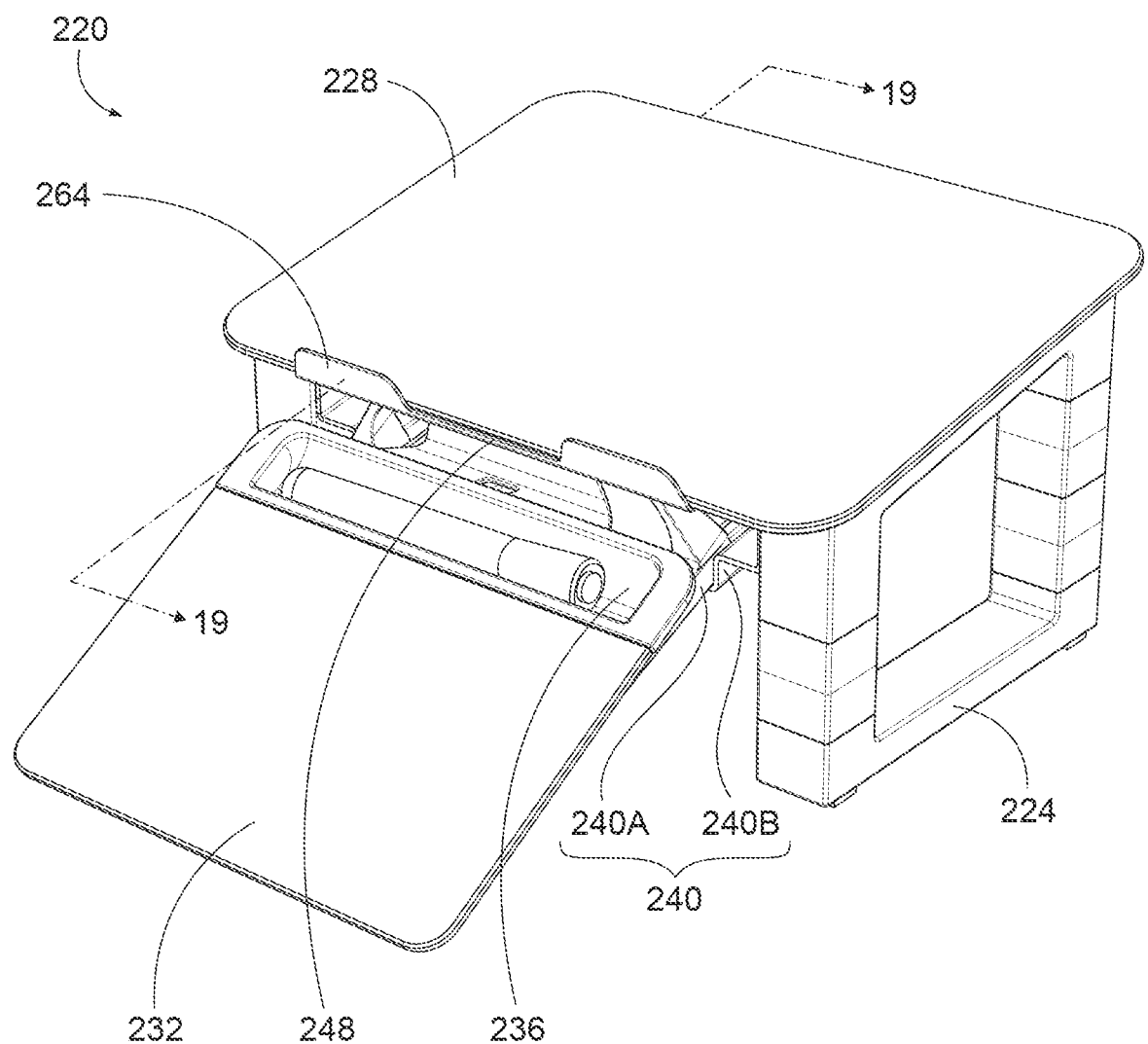
FIG. 18 is a perspective view of the monitor riser of FIG. 15, showing the dry erase pad deployed while configured to provide the increased riser height.
Figure 19:
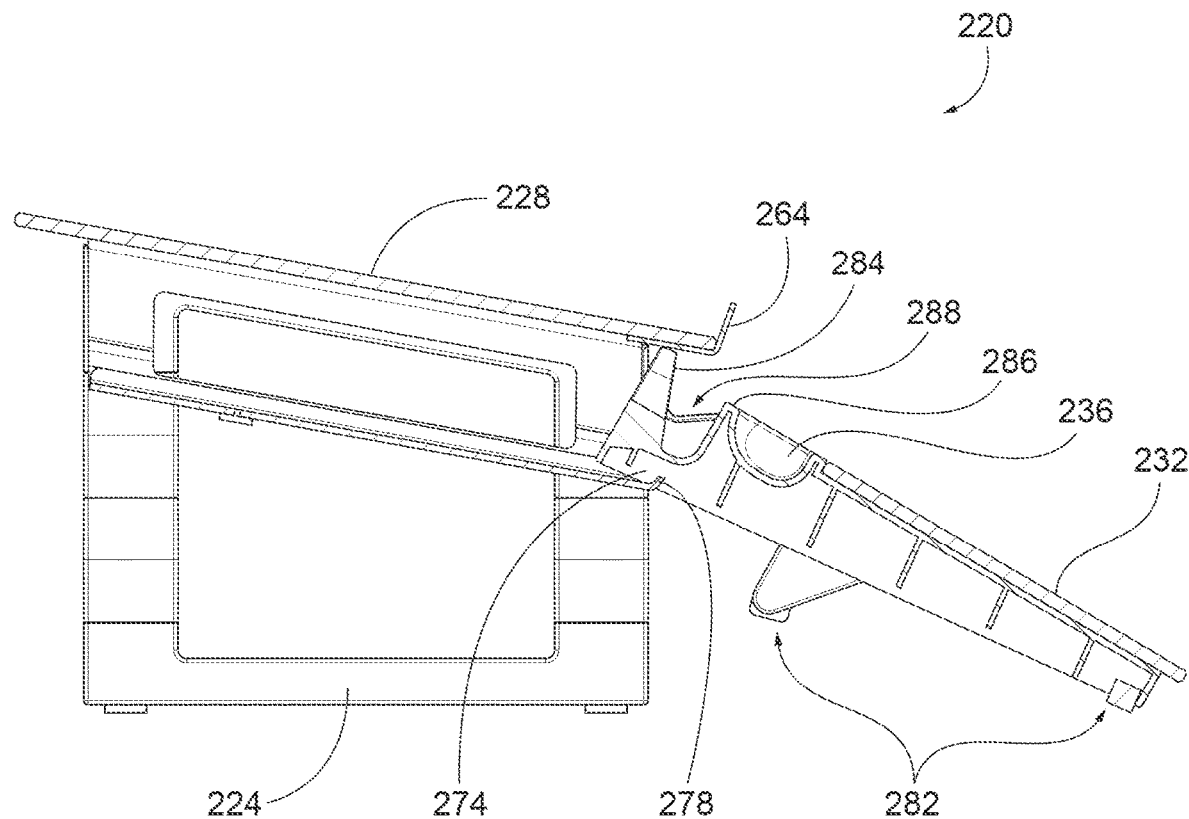
FIG. 19 is cross-section of the monitor riser taken along line 19-19 of FIG. 18.
Figure 20:
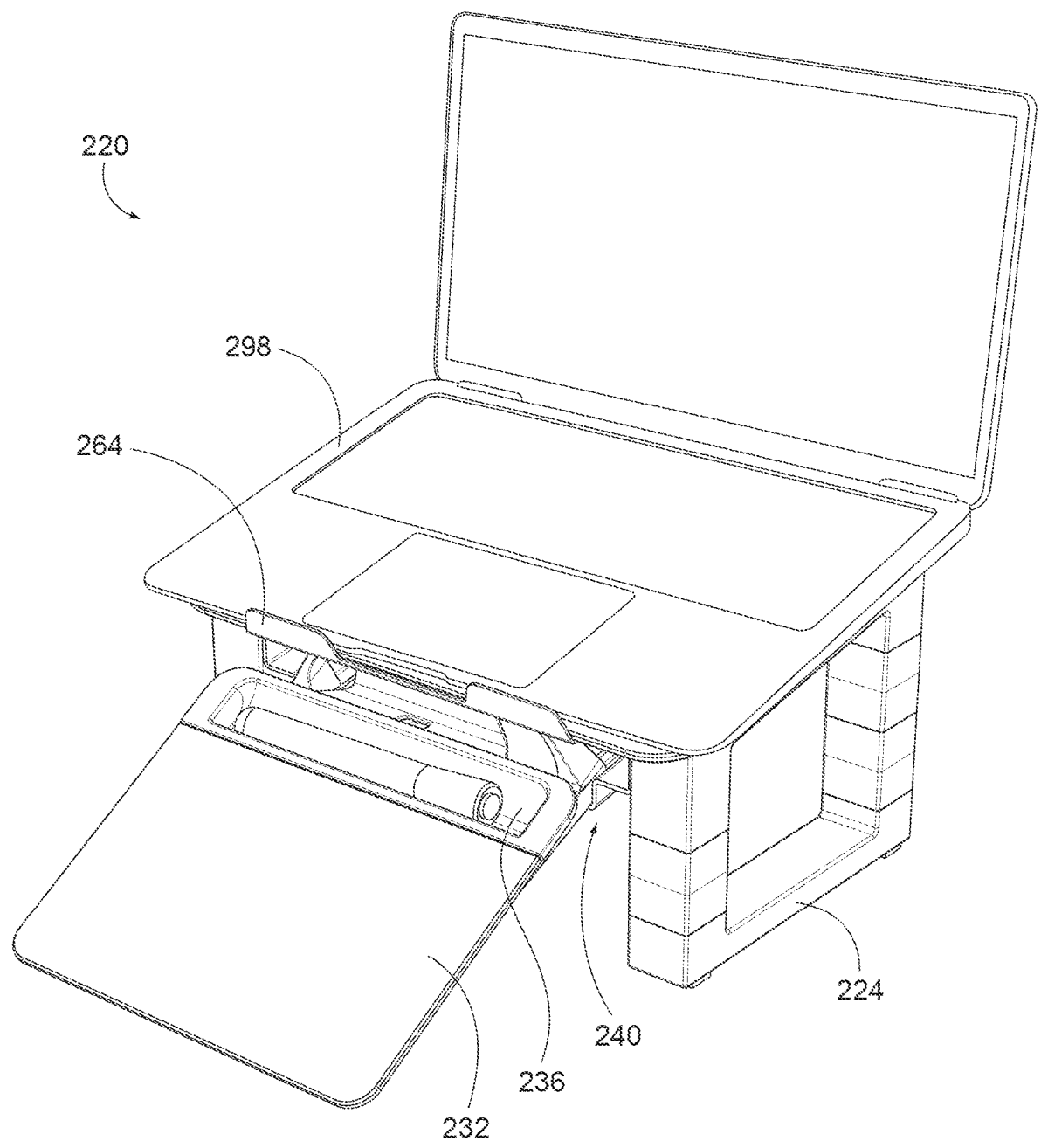
FIG. 20 is a perspective view of the monitor riser of FIG. 15, supporting a laptop computer on the angled support shelf.

FIGS. 15 to 21 illustrate a monitor riser 220 according to a third embodiment. The monitor riser 220 can include any or all of the features noted above with respect to the monitor riser 20 of FIGS. 1-13. Likewise, the aspect ratio(s) of the support shelf 228 and/or the dry erase pad 232 can be varied as particularly disclosed with respect to FIG. 14. Thus, reference is made to the preceding description. However, the monitor riser 220 of FIGS. 15 to 20 has certain features that distinguish it from the monitor risers of the preceding embodiments. In particular, the monitor riser 220 has a height H4 at a front or user-facing side that is different from (and less than) a height H5 at a rear side that faces away from the user. The rear height H5 can be at least 10 percent, at least 20 percent, or at least 30 percent greater than the front height H4. The front to rear height differentiation causes the support shelf 228 to be angled toward the user rather than horizontal, when the monitor riser 220 is placed on a horizontal support surface. Due to the angling of the surface of the support shelf 228 downward toward the front or user-facing side (e.g., greater than 5 degrees and not more than 25 degrees, and in some constructions not more than 15 degrees), objects placed on the support shelf 228 may have a tendency to slide toward the front edge 248 by the force of gravity. Thus, a retainer or ledge 264 is formed at the front edge 248. The ledge 264 can extend upwardly from the front edge 248 by 25 mm or less in some constructions, e.g., 18 mm or less. The ledge 264 can extend upwardly from the front edge 248 by at least 5 mm in some constructions. The ledge 264 can be formed as a thin strip of material bonded or otherwise fastened to the underside of the support shelf 228. The ledge 264 can be uniform, non-uniform, centered, offset, divided into sections (e.g., bifurcated as shown), and generally shaped and placed in a variety of configurations. FIG. 20 illustrates a laptop computer 298 (including an integral monitor) supported on the angled support shelf 228 and retained by the ledge 264. Thus, the monitor riser 220 may more particularly be referred to as a laptop riser or laptop stand, as it will be generally unsuitable for use with a conventional standalone monitor.

Figure 15:
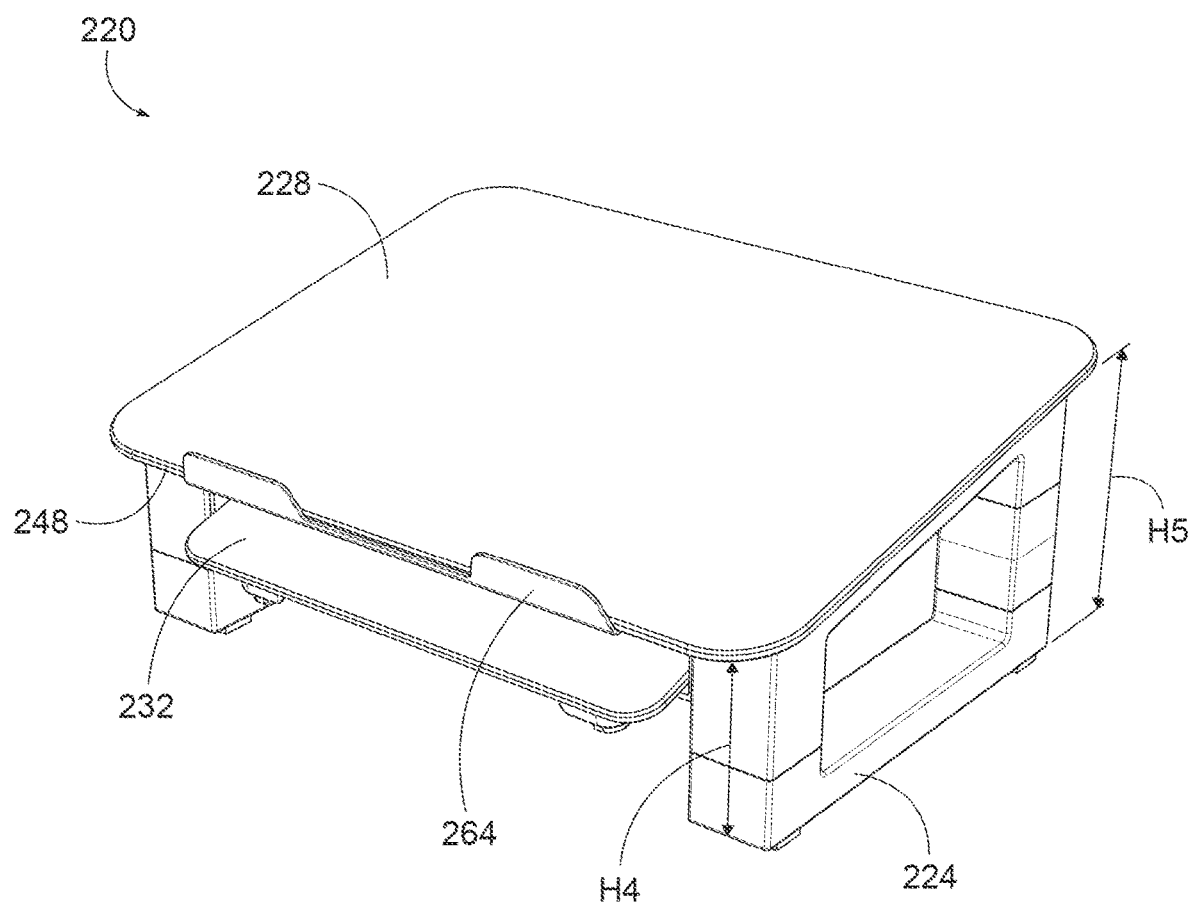
FIG. 15 is a perspective view of a monitor riser of a third embodiment, including an angled support shelf.
Figure 16:
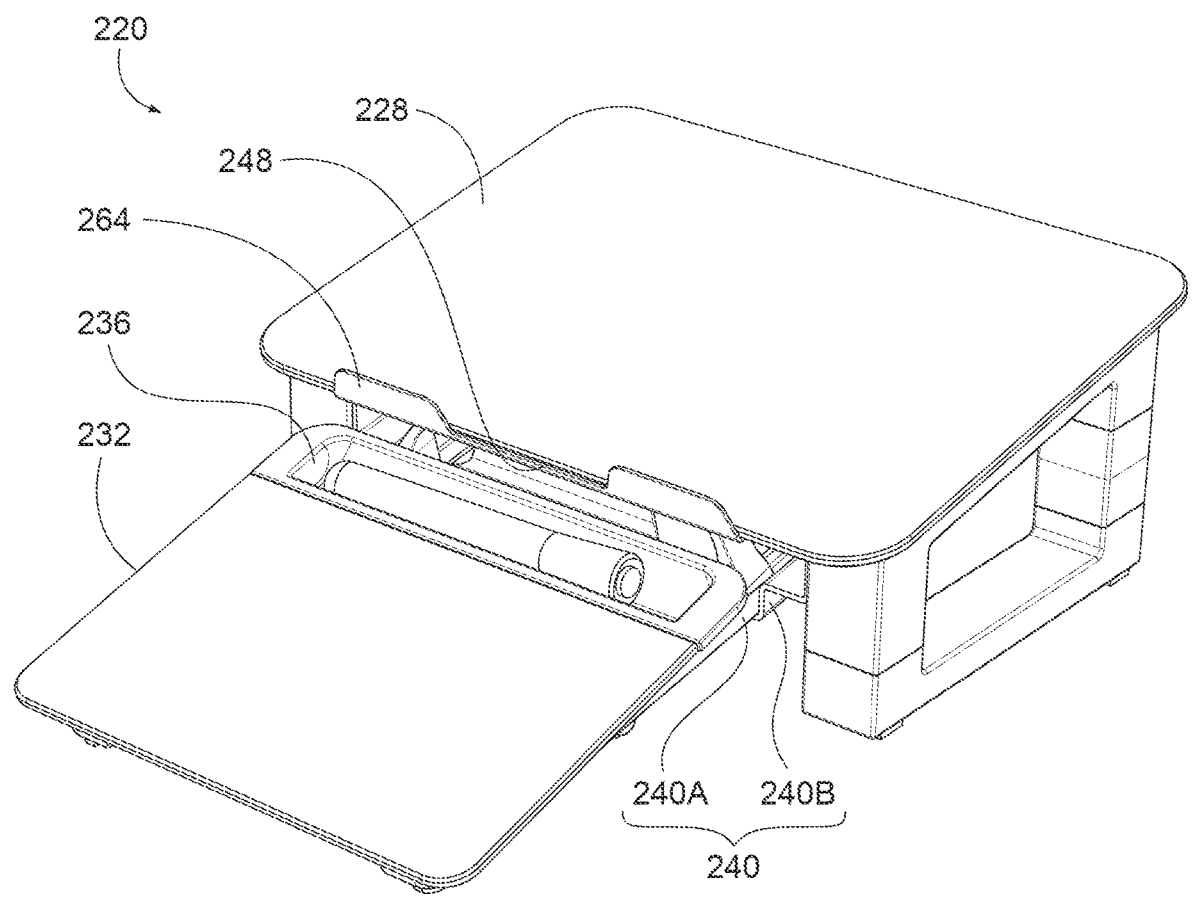
FIG. 16 is a perspective view of the monitor riser of FIG. 15, showing a dry erase pad in a deployed position.
Figure 17:
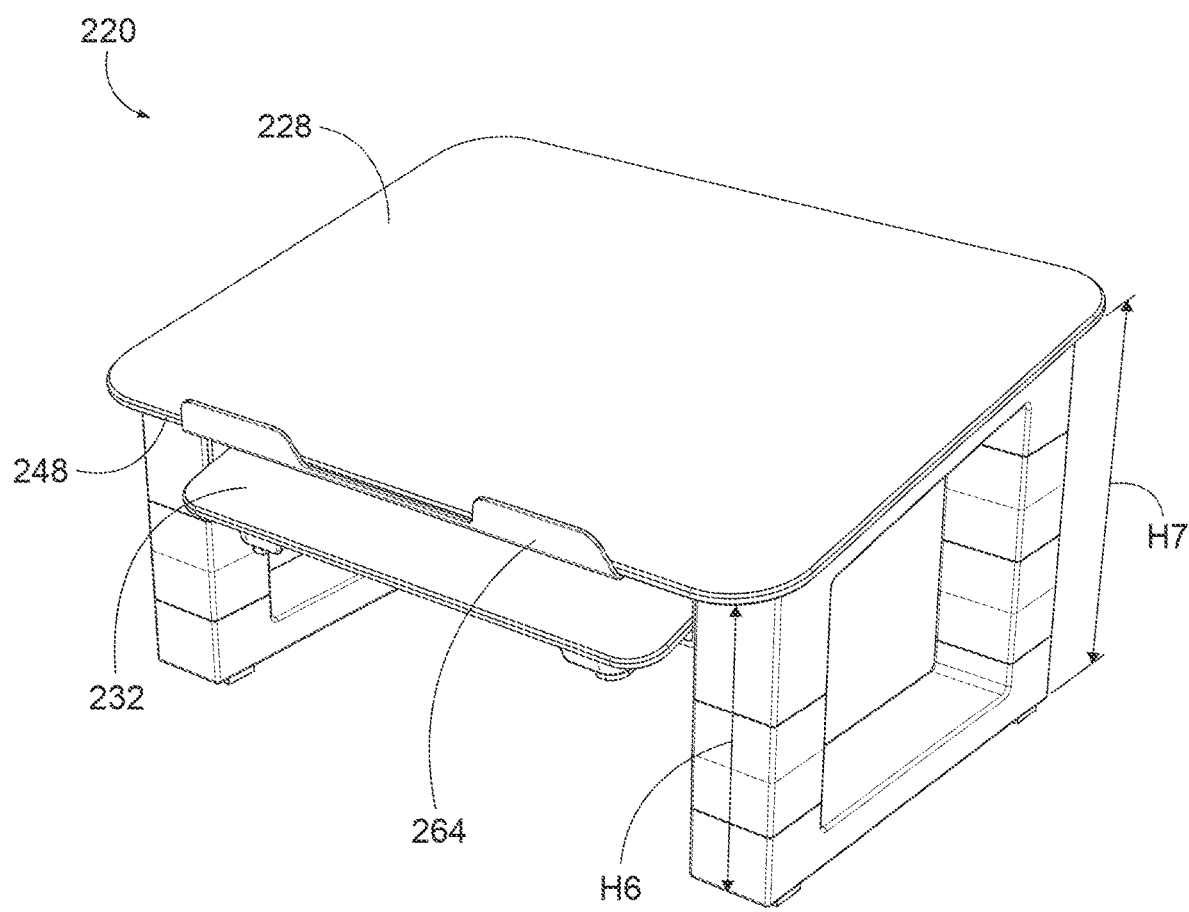
FIG. 17 is a perspective view of the monitor riser of FIG. 15 configured to provide an increased riser height.

FIGS. 15-16 illustrate the dry erase pad 232 stowed and extended, respectively, with the monitor riser 220 having the base elements 224 provided in a first configuration that achieves the first and second heights H4, H5. FIGS. 17-18 illustrate the dry erase pad 232 stowed and extended, respectively, with the monitor riser 220 having the base elements 224 provided in a second configuration that achieves the third and fourth heights H6, H7, wherein the third height H6 is greater than the first height H4 and the fourth height H7 is greater than the second height H5. As described above, this can be achieved by additive sequential vertical course(s) of the base elements 224. Whether the monitor riser 220 is configured as having the heights H4, H5 of FIGS. 15-16 or having the heights H6, H7 of FIGS. 17-18, the dry erase pad 232 can extend out from the stowed position to the extended position to expose the dry erase pad 232 for use, along with the optional marker tray 236. When extended out, the dry erase pad 232 can also hinge or pivot down to a propped position so that a front edge thereof can be lower, e.g., at the same height as the bottom of the base elements 224. This can be achieved by the hinging a rear portion or rear edge of the dry erase pad 232 with respect to the slide mechanism 240. In some constructions, the slide mechanism 240 is provided by a pair of rails or first slide members 240A fixed to the underside of the dry erase pad 232 and a pair of slide trays or second slide members 240B fixed to the support shelf 228 and/or base elements 224 and configured to nestingly receive the respective rails 240A on the dry erase pad 232. As best shown in the cross-section of FIG. 19, the downward pivoting movement of the dry erase pad 232 can be provided by a hook engagement between a rear portion (e.g., pocket 274) of the dry erase pad 232 and a respective hook 278 at a front portion of the slide trays 240B to limit the travel of the dry erase pad 232. As shown in FIG. 19, adequate space is provided for the rear portion of the dry erase pad 232 to disengage from the hook 274 by lifting the rear edge of the dry erase pad 232. Thus, without removal of parts, without tools, and with only the single step outlined above, the dry erase pad 232 can be completely separated from the support shelf 228 and base as shown in FIG. 20.

Figure 21:
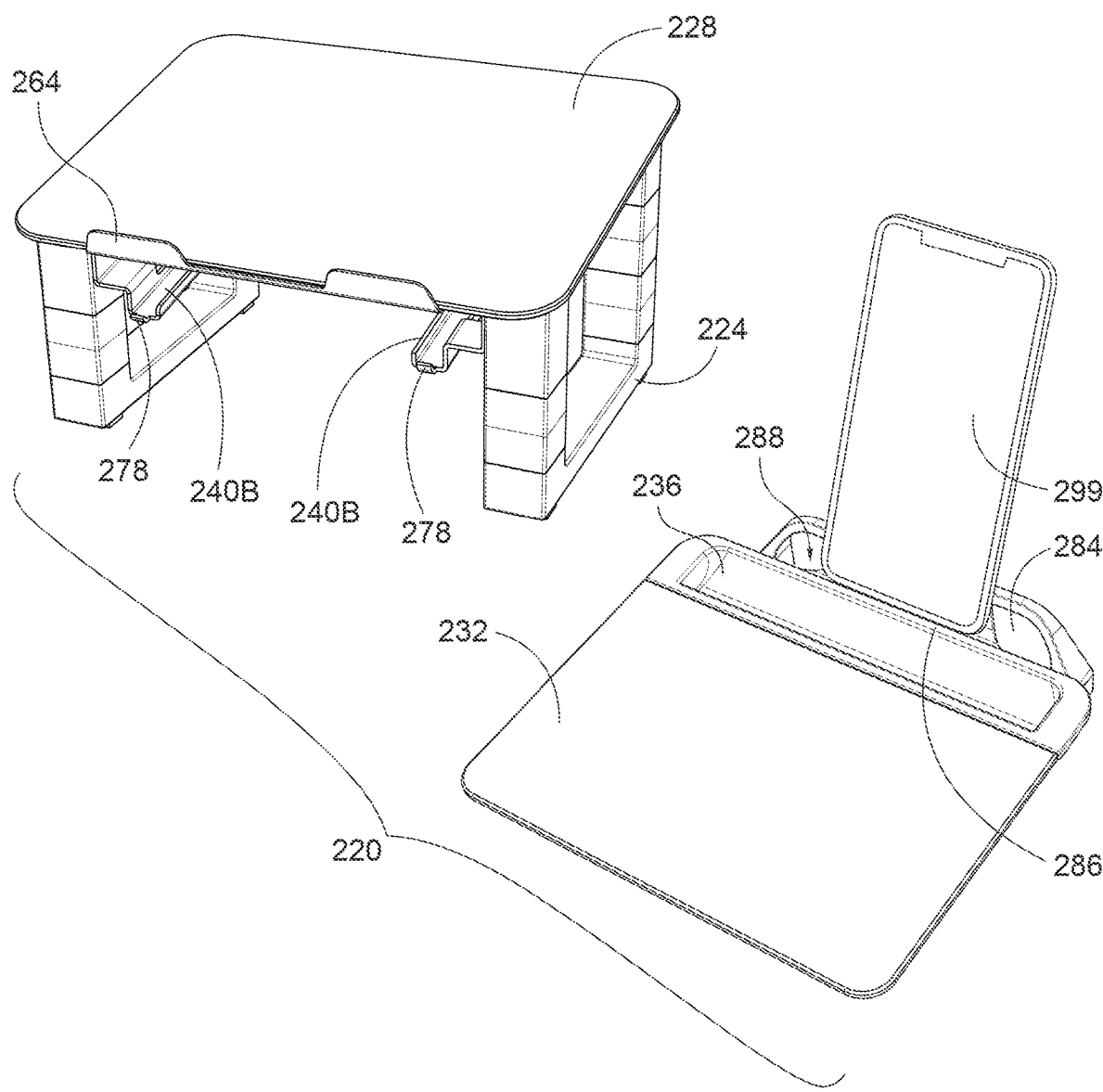
FIG. 21 is a perspective view illustrating the dry erase pad removed from the angled support shelf and supporting a mobile phone.

Although it is possible for the dry erase pad 232 to be configured to present the writing surface in a horizontal orientation when separated and placed on a horizontal support surface, the dry erase pad 232 of the illustrated construction includes one or more feet 282 (FIG. 19) on the side opposite the writing surface, the feet 282 configured to present the writing surface of the dry erase pad 232 at an angle with the front or user-facing side being lower. The intrinsic angle between the writing surface and the bottom of the feet 282 can be similar to the angle between the support shelf 228 and the base elements 224 described above such that reference is made to the above angle measures. The angle for the separated dry erase pad 232 can be the same as or different than the angle of the support shelf 228. In addition to providing use of the dry erase pad 232 at other locations away from the remainder of the monitor riser 220, the dry erase pad 232 can also include an integral support stand for a small mobile electronic device, such as a phone 299 as shown in FIG. 21. For example, the dry erase pad 232 can include an upstanding backstop 284 at a rear edge thereof, e.g., directly rearward of the marker tray 236. Additionally, a ledge 286 is provided on the dry erase pad 232 spaced forwardly of a front face of the backstop 284. The ledge 286 of the illustrated construction is formed by the rear edge of the marker tray 236, although the ledge 286 may be formed in other ways. Between the backstop 284 and the ledge 286 a pocket 288 is formed. Measured in a front-rear direction along a plane of the dry erase writing surface, the pocket 288 can have a width of at least 10 mm and less than 30 mm, e.g., less than 25 mm. Measured perpendicular to the dry erase writing surface, the ledge 286 can stand up from the pocket 288 at least 2.5 mm and less than 10 mm. This measure can define a minimum depth of the pocket 288, with the pocket depth increasing from the ledge 286 toward the backstop 284.

Various features and advantages of the embodiments are set forth in the following claims.

What is claimed is:

1. A monitor riser comprising:
   a base configured to be received on a horizontal support surface;
   a monitor support shelf situated atop and supported by the base;
   a slide mechanism situated below the monitor support shelf; and
   a dry erase pad supported by the slide mechanism and movable in a frontward direction from a stowed position in which the dry erase pad is at least partially received under the monitor support shelf to an extended position,
   wherein the dry erase pad, when in the extended position, is movable to a propped position in which the dry erase pad is angled from horizontal to present a dry erase writing surface toward a user at a front side of the monitor support shelf.

2. The monitor riser of claim 1, wherein an underside of the dry erase pad includes a plurality of retainers separately engageable with a front edge of the monitor support shelf to define a plurality of uniquely-angled propped positions of the dry erase pad.

3. The monitor riser of claim 1, wherein the dry erase pad is pivotally coupled with the slide mechanism at a hinge.

4. The monitor riser of claim 3, wherein the hinge is positioned adjacent a front edge of the dry erase pad.

5. The monitor riser of claim 1, wherein the dry erase pad is provided with a first slide member of the slide mechanism that is nestingly received by a second slide member of the slide mechanism, the second slide member being fixed in relation to the base and the monitor support shelf, and wherein a hook engagement is provided between a rear portion of the dry erase pad and a hook at a front portion of the second slide member.

6. The monitor riser of claim 5, wherein the dry erase pad is separable from the monitor riser without removal of parts, without tools, and by only the single step of lifting the rear portion of the dry erase pad off the hook.

7. The monitor riser of claim 1, wherein the dry erase pad is separable from the monitor riser without removal of parts and without tools, the dry erase pad comprising one or more feet provided on an underside of the dry erase pad opposite the writing surface thereof, wherein the one or more feet set the writing surface of the dry erase pad at an angle from horizontal when the one or more feet are supported on a horizontal support surface.

8. The monitor riser of claim 1, wherein the dry erase pad is separable from the monitor riser, the dry erase pad including an integral support stand configured to hold a mobile electronic device, the integral support stand situated rearward of the writing surface of the dry erase pad.

9. The monitor riser of claim 1, wherein the dry erase pad includes a marker tray positioned adjacent the writing surface.

10. The monitor riser of claim 1, wherein the base comprises a plurality of support blocks that snap together with each other in a vertical direction to build sequential vertical courses for setting a user's desired height of the monitor support shelf.

11. The monitor riser of claim 1, wherein one or both of the monitor support shelf and the dry erase pad is provided by a glass panel.

12. A monitor riser comprising:
    a monitor support shelf situated atop and supported by a base; and
    a dry erase pad movable from a stowed position under the monitor support shelf to an extended position,
    wherein the dry erase pad, when in the extended position, is pivotable to a plurality of propped positions, each of which presents a dry erase writing surface of the dry erase pad to be angled toward a front user-facing side of the monitor support shelf.

13. The monitor riser of claim 12, wherein an underside of the dry erase pad includes a plurality of retainers separately engageable with a front edge of the monitor support shelf to define the plurality of propped positions of the dry erase pad.

14. The monitor riser of claim 12, wherein the dry erase pad is movable from the stowed position to the extended position by a slide mechanism, and the dry erase pad is pivotally coupled with the slide mechanism at a hinge.

15. The monitor riser of claim 14, wherein the hinge is positioned adjacent a front edge of the dry erase pad.

16. The monitor riser of claim 12, wherein the dry erase pad is movable from the stowed position to the extended position by a slide mechanism, wherein the dry erase pad is provided with a first slide member of the slide mechanism that is nestingly received by a second slide member of the slide mechanism, the second slide member being fixed in relation to the base and the monitor support shelf, and wherein a hook engagement is provided between a rear portion of the dry erase pad and a hook at a front portion of the second slide member.

17. The monitor riser of claim 16, wherein the dry erase pad is separable from the monitor riser without removal of parts, without tools, and by only the single step of lifting the rear portion of the dry erase pad off the hook.

18. The monitor riser of claim 12, wherein the dry erase pad is separable from the monitor riser without removal of parts and without tools, the dry erase pad comprising one or more feet provided on an underside of the dry erase pad opposite the writing surface thereof, wherein the one or more feet set the writing surface of the dry erase pad at an angle from horizontal when the one or more feet are supported on a horizontal support surface.

19. The monitor riser of claim 12, wherein the dry erase pad is separable from the monitor riser, the dry erase pad including an integral support stand configured to hold a mobile electronic device, the integral support stand situated rearward of the writing surface of the dry erase pad.

20. The monitor riser of claim 12, wherein the dry erase pad includes a marker tray positioned adjacent the writing surface.

21. The monitor riser of claim 12, wherein the base of the monitor riser comprises a plurality of support blocks that snap together with each other in a vertical direction to build sequential vertical courses for setting a user's desired height of the monitor support shelf.

22. The monitor riser of claim 12, wherein one or both of the monitor support shelf and the dry erase pad is provided by a glass panel.

* * * * *